United States Patent
Boutros et al.

(10) Patent No.: US 9,699,087 B2
(45) Date of Patent: *Jul. 4, 2017

(54) SYSTEM AND METHOD FOR REPORTING OUT-OF-RESOURCES (OOR) CONDITIONS IN A DATA NETWORK

(71) Applicant: Cisco Technology, Inc., San Jose, CA (US)

(72) Inventors: Sami Boutros, Union City, CA (US); Muthurajah Sivabalan, Kanata (CA); David D. Ward, Somerset, WI (US); Stefano B. Previdi, Rome (IT); Jean-Philippe Vasseur, Dunstable, MA (US); Rodolphe Figaro, Windham, NH (US); Reshad A. Rahman, Ottawa (CA)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/229,503

(22) Filed: Mar. 28, 2014

(65) Prior Publication Data
US 2014/0211629 A1    Jul. 31, 2014

Related U.S. Application Data

(63) Continuation of application No. 10/964,184, filed on Oct. 13, 2004, now Pat. No. 8,717,899.

(51) Int. Cl.
*H04L 12/803* (2013.01)
*H04L 12/24* (2006.01)
(Continued)

(52) U.S. Cl.
CPC ............ *H04L 47/125* (2013.01); *H04L 41/06* (2013.01); *H04L 45/00* (2013.01); *H04L 45/50* (2013.01);
(Continued)

(58) Field of Classification Search
CPC ......... H04L 43/50; H04L 45/02; H04L 45/50; H04L 47/10; H04L 47/745; H04L 47/2408; H04L 47/125
(Continued)

(56) References Cited

U.S. PATENT DOCUMENTS 6,493,317 B1    12/2002    Ma
6,515,966 B1    2/2003    Bardalai et al.
(Continued)

OTHER PUBLICATIONS

Katz, et al., "Traffic Engineering (TE) Extensions to OSPF Version 2," Network Working Group, RFC 3630, The Internet Society, Sep. 2003.
(Continued)

*Primary Examiner* — Feben M Haile
(74) *Attorney, Agent, or Firm* — Polsinelli LLP (57) ABSTRACT

A system and method for advertising out-of-resources (OOR) conditions for entities, such as nodes, line cards and data links, in a manner that does not involve using a maximum cost to indicate the entity is "out-of-resources." According to the technique, an OOR condition for an entity is advertised in one or more type-length-value (TLV) objects contained in an advertisement message. The advertisement message is flooded to nodes on a data network to inform them of the entity's OOR condition. Head-end nodes that process the advertisement message may use information contained in the TLV object to determine a path for a new label switched path (LSP) that does not include the entity associated with the OOR condition.

20 Claims, 10 Drawing Sheets

(51) Int. Cl.
  *H04L 12/701* (2013.01)
  *H04L 12/723* (2013.01)
  *H04L 12/851* (2013.01)
  *H04L 12/911* (2013.01)

(52) U.S. Cl.
  CPC ........ *H04L 47/2408* (2013.01); *H04L 47/745* (2013.01)

(58) Field of Classification Search
  USPC ....... 370/229, 230, 231, 235, 236, 241, 252, 370/389, 400
  See application file for complete search history.

(56) References Cited

U.S. PATENT DOCUMENTS

| | | |
|---|---|---|
| 6,665,273 B1 | 12/2003 | Goguen et al. |
| 6,785,436 B2 | 8/2004 | Ravikanth et al. |
| 6,895,441 B1 | 5/2005 | Shabtay et al. |
| 6,910,148 B1 | 6/2005 | Ho et al. |
| 6,985,959 B1 | 1/2006 | Lee |
| 2003/0185217 A1 | 10/2003 | Ganti et al. |
| 2003/0208621 A1* | 11/2003 | Bowman ...................... 709/242 |
| 2004/0114595 A1 | 6/2004 | Doukai |
| 2005/0276216 A1* | 12/2005 | Vasseur .................. H04L 45/02 370/222 |

OTHER PUBLICATIONS

Resource ReSerVation Protocol (RSVP), RFC 2205, IETF, http://www.ietf.org, Sep. 1997.
Extensions to OSPF for Advertising Optional Router Capabilities, Internet Draft, IETF, http://www.ietf.org, Jul. 2004.
The OSPF Opaque LSA Option, RFC 2370, IETF, http://www.ietf.org, Jul. 1998.
OSPF Version 2, RFC 2328, IETF, http://www.ietf.org, Apr. 1998.
OSPF MPLS Traffic Engineering Capabilities, Internet Draft, IETF, httph://www.ietf.org, Jul. 2004.
"Notification of Transmittal of the International Search Report and the Writtten Opinion of the International Searching Authority, or the Declaration," for International Application No. PCT/US05/35930, with the International Filing date of Oct. 6, 2005.

* cited by examiner

| TYPE 620 | | LENGTH 630 |
|---|---|---|
| FLAGS | ROUTER OOR FLAGS 640 | UNUSED |

FIG. 6

| TYPE 720 | LENGTH 730 |
|---|---|
| LINK OOR FLAGS 740 | UNUSED |

SYSTEM AND METHOD FOR REPORTING OUT-OF-RESOURCES (OOR) CONDITIONS IN A DATA NETWORK

RELATED APPLICATIONS

This application is a continuation of U.S. patent application Ser. No. 10/964,184, filed on Oct. 13, 2004, the content of which is incorporated herein by reference in its entirety.

BACKGROUND OF THE INVENTION

Field of the Invention

The present invention relates to data networks and more specifically to reporting out-of-resources (OOR) conditions in a data network.

Background Information

A data network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect nodes over dedicated private communications links located in the same general physical location, such as a building or campus. WANs, on the other hand, typically connect large numbers of geographically dispersed nodes over long-distance communications links, such as common carrier telephone lines. The Internet is an example of a WAN that connects disparate networks throughout the world, providing global communication between nodes on various networks. Nodes typically communicate over a data network by exchanging discrete frames or packets of data according to predefined protocols, such as the Transmission Control Protocol/Internet Protocol (TCP/IP). In this context, a protocol consists of a set of rules defining how the nodes interact with each other.

In a typical arrangement, end nodes in a data network are coupled via one or more intermediate nodes, such as routers. Routers are often configured to "route" data, such as packets, between various nodes in the network. Routing is typically performed at layer-3 (L3), which is the network layer of the Open Systems Interconnect Reference Model (OSI-RM).

Routers often maintain forwarding databases (FDBs), which are typically configured to hold routing information which may include L3 addresses and interface information that the router uses to determine where data (e.g., data packets) are forwarded in order to reach their destination. For example, a router may have a FDB organized as a routing table containing one or more entries wherein each entry contains a L3 destination address of a destination node and interface information about an interface on the router through which the destination node may be reached. A data packet containing a destination address that matches a destination address of an entry in the routing table is forwarded by the router to the interface specified by the matching entry for transfer to the destination node.

A router may execute one or more routing protocols that enable the router to route packets and exchange routing information with other routers in the network. The routers often use this information to configure (e.g., compute) their FDBs. The routing protocols may include distance-vector protocols, such as the well-known Routing Information Protocol (RIP), or link-state protocols, such as the well-known Intermediate-System-to-Intermediate-System (IS-IS) and Open Shortest Path First (OSPF) protocols. Routing information is typically exchanged between the routers in the form of advertisement messages. For example, nodes executing the OSPF protocol exchange routing information (e.g., link state) using an advertisement message called a Link State Advertisement (LSA). As used herein, an advertisement message refers generically to a message that a routing protocol uses to convey routing information to other intermediate nodes (e.g., a router, a switch) in the network. An intermediate node that acquires an advertisement message may use information contained therein to update its FDB.

Routers may transfer data packets through the network between a source and destination in a "connection-oriented" manner using a connection-oriented protocol. A connection-oriented protocol transfers data packets through the network over a predefined path, often called a connection or circuit, that is established between the source and destination. Here, the connection or circuit is established between the source and destination before any data are transferred. After the connection has been established, data are transferred between the source and destination over a path defined by the connection.

Some connection-oriented protocols utilize unidirectional connections, i.e., connections that transfer data in one direction from a source to a destination. For example, a unidirectional connection between a router A and a router B transfers data in one direction from router A to router B. In order to transfer data in the other direction, i.e., from router B to router A, another unidirectional connection from router B to router A would have to be established.

The connections may be "signaled" end-to-end using a signaling protocol, such as the Resource Reservation Protocol (RSVP). The end of the connection that initiates the signaling for the connection is often called the "head-end" of the connection and the end of the connection that terminates the signaling is often called the "tail-end" of the connection. A router hosting the head-end of the connection is often called the head-end node and a router hosting the tail-end of the connection is often called the tail-end node. Thus, for example, in a connection from a source to a destination where router A hosts the "head-end" of the connection and router B hosts the tail-end of the connection, router A is the head-end node and router B is the tail-end node.

When the connection is no longer needed, the connection is typically "torn down" and resources, such as nodes, interfaces, protocols and so on, utilized by the connection are made available for other connections. A resource, as used herein, refers to entities associated with an intermediate node. These entities may include the intermediate node itself, an interface (e.g., a port) on the intermediate node and a protocol running on the intermediate node.

Multiprotocol Label Switching (MPLS)

An example of a well-known connection-oriented protocol is the Multiprotocol Label Switching (MPLS) protocol. MPLS employs an innovative label-based forwarding technique that simplifies Internet Protocol (IP) traffic routing in complex networks. MPLS provides a framework that embodies various features enabled by a connection-oriented link layer including, e.g., Quality of Service (QoS), Traffic Engineering and Constraint-based Routing (CR).

According to the MPLS protocol, a label is added to a packet by a head-end node of a pre-determined labeled-switched path (LSP). The head-end node is typically a label-switching router (LSR) often called an ingress LSR. The LSP is a pre-determined path that is taken by the packet through the network from the "head-end" of the LSP to the "tail-end" of the LSP and the label typically contains information (e.g., tags) associated with the LSP. As the packet traverses the LSP, LSRs handling the packet use the tag information contained in the label to "switch" the packet along the LSP. When the packet reaches a node at the "tail-end" of the LSP (e.g., a egress LSR), the label is removed and the modified packet may be further processed (e.g., routed), accordingly.

MPLS-Traffic Engineering (MPLS-TE)

Traffic engineering (TE) relates to the process of selecting paths utilized by data traffic in a manner that facilitates efficient and reliable network operations while optimizing network resource utilization and data traffic performance. TE works within various bandwidth and administrative requirements to choose a path that is optimal for carrying data traffic. A goal of TE is to compute a path from one node to another where the path does not violate various constraints, such as bandwidth and various administrative requirements, and is optimal with respect to some scalar metric. Once a path is chosen, TE is responsible for establishing and maintaining state along the path.

Although the MPLS protocol provides underlying technologies in forwarding packets in MPLS networks, it alone does not provide all of the components necessary for TE support. MPLS-TE is an extension of the MPLS protocol that employs TE to establish and maintain MPLS-TE labeled-switched paths (MPLS-TE LSPs). MPLS-TE LSPs are set up by MPLS-TE in a manner that ensures resources are available for data flows that use the MPLS-TE LSP. MPLS-TE LSPs often originate at a head-end LSR and terminate at a tail-end LSR. Protocols, such as RSVP-TE, are typically used to reserve the resources for the MPLS-TE LSP.

MPLS Differentiated Services TE (DS-TE)

MPLS Differentiated Services TE (DS-TE) is an extension of MPLS-TE that enables traffic to be classified on a class of service (CoS) basis. With DS-TE data flows are classified into classes and resources are allocated to the data flows on a per-class basis. Packets belonging to a particular DS-TE class are said to constitute a Behavior Aggregate (BA).

At an ingress node (e.g., ingress LSR) of a DS-TE LSP, a packet is marked with a MPLS shim header and classified into DS-TE classes and steered onto appropriate DS-TE LSP. The shim header comprises a 20-bit label value and a 3-bit experimental value. LSRs that acquire the packet use the 3-bit experimental value and/or the 20-bit label value to determine the treatment the packet receives.

Out-of-Resources (OOR) Condition

During the establishment of an MPLS-TE LSP, nodes along the path may either accept the MPLS-TE LSP or reject it. One condition that may cause a node to reject an MPLS-TE LSP is an "out-of-resources" (OOR) condition. An OOR condition may occur when, for example, allowing the new MPLS-TE LSP would cause the node to: (1) exceed the maximum number of MPLS-TE LSPs allowed for the node, (2) run out of MPLS-TE LSP label space and/or (3) exhaust various hardware resources on the node.

When an MPLS-TE LSP is rejected, the node rejecting the MPLS-TE LSP typically communicates the rejection to the head-end node that initiated the MPLS-TE LSP via a rejection message. The head-end node may respond to the rejection by "pruning" the rejecting node from its routing topology and computing an alternate path for the MPLS-TE LSP that does not use the rejecting node.

Certain routing protocols, such as OSPF, often advertise bandwidth that is available for certain links. Here, a head-end LSR may use this information to compute a path that a new MPLS-TE LSP (established from the head-end LSR) could take. However, while a link in the computed path may initially have sufficient resources with respect to, e.g., bandwidth at the time the path was computed, it may thereafter have insufficient resources (e.g., a lack of hardware resources) at the time the path is actually established. Thus, while advertised bandwidth information may be useful to a head-end LSR for calculating a prospective path the information may turn out to be misleading when the MPLS-TE LSR is actually established.

An existing technique for handling an OOR condition associated with an entity, such as a data link, line card or a node, involves advertising the entity as having a "maximum cost" in an advertisement message. By advertising a maximum cost associated with the entity, other nodes in the network are discouraged from using the entity in their path calculations for new MPLS-TE LSPs. However, advertising an entity as having a maximum cost is not a precise way to report an OOR condition for the entity. Rather, nodes on the network may still use the entity in their path calculations for new MPLS-TE LSPs if no other lower cost alternatives are available.

Another problem with advertising an entity as having a maximum cost involves disrupting existing MPLS-TE LSPs. Since the maximum cost indicates that the entity has a high cost associated with it, on learning of the high cost associated with the entity a node may respond by recalculating paths for existing MPLS-TE LSPs that use the entity in an effort to avoid the entity. This, in turn, may cause disruption to existing data flows that use these LSPs.

Yet another problem associated with advertising an entity as having a maximum cost is that it may not provide sufficient information to a head-end node of a MPLS-TE LSP to enable the node to distinguish between DS-TE classes that can no longer use the entity and DS-TE classes that may still use the entity. This may be the case where resources on the node are provisioned on a per-DS-TE class basis.

SUMMARY OF THE INVENTION

The present invention overcomes shortcomings associated with the prior art by providing a technique for reporting out-of-resources (OOR) conditions for entities, such as nodes, line cards and data links of a data network, that does not involve advertising the entity as having a maximum cost to indicate the entity is "out-of-resources." According to the technique, an intermediate node reports that an entity associated with the intermediate node is out of resources by i) generating an advertisement message having one or more type-length-value (TLV) objects wherein each TLV object is configured to report OOR conditions of the entity, ii) reporting one or more OOR conditions of the entity in one or more of the TLV objects and iii) flooding (broadcasting) the advertisement message onto the data network. Nodes at the head-end of new label-switched paths (LSPs) may use information contained in the TLV object to determine paths for new LSPs that avoid the entity.

In the illustrated embodiment, the TLV objects contain flags that are used to report OOR conditions of an entity. Illustratively, the flags are organized as 8-bit values wherein each bit represents a Multiprotocol Label Switching Differentiated Services Traffic Engineering (DS-TE) class. If a DS-TE class for a particular entity, such as a node, line card or data link, encounters an OOR condition, the router asserts flags in one or more TLV objects corresponding to the entity's DS-TE class indicating the entity is "out-of-resources" for that DS-TE class.

Advantageously, the present invention is an improvement over prior techniques in that it informs nodes in the system of an OOR condition for a particular entity without having to resort to advertising the entity as having a maximum cost. By not advertising the entity as having a maximum cost, nodes at the head-end of existing LSPs that use the entity may avoid recalculating paths for the LSPs, thus avoiding unnecessary disruption to data flows carried on the LSPs. In addition, since the head-end nodes made are aware of the OOR condition, the head-end nodes may avoid using the entity in their path calculations for new LSPs. Further, the present invention allows a head-end node to discern, for a particular entity, between DS-TE classes associated with the entity that have encountered an OOR condition and DS-TE classes that have not, thus enabling the head-end node to take this in to account when calculating paths for new LSPs.

BRIEF DESCRIPTION OF THE DRAWINGS

The above and further advantages of the invention may be better understood by referring to the following description in conjunction with the accompanying drawings in which like reference numbers indicate identical or functionally similar elements.

DETAILED DESCRIPTION OF AN ILLUSTRATIVE EMBODIMENT

Figure 1:
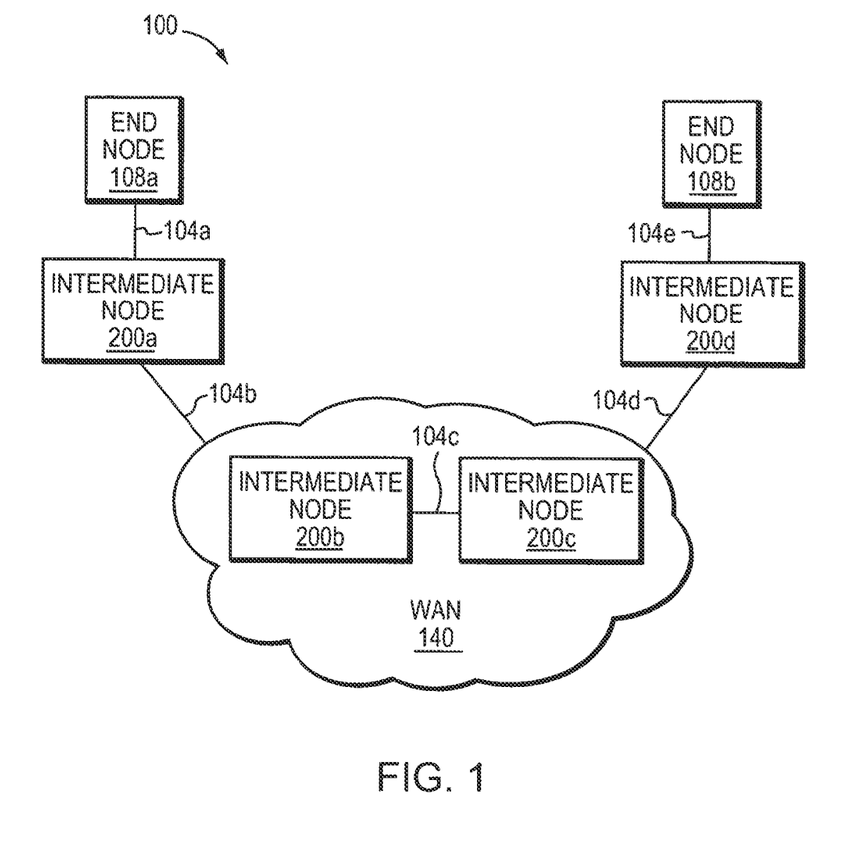
FIG. 1 is a high-level schematic block diagram of a data network that may be advantageously used with the present invention.

FIG. 1 is a schematic block diagram of a data network 100 that may be advantageously used with the present invention. The data network 100 comprises a collection of communication (data) links 104 connected to a plurality of network nodes, such as end nodes 108a-b and intermediate nodes 200a-d, to form an internetwork of network nodes. Intermediate nodes 200b-c are part of a wide-area network (WAN) 140, such as the Internet. The internetworked nodes communicate by exchanging data packets according to a predefined set of protocols, such as the Transmission Control Protocol/Internet Protocol (TCP/IP) or the Multiprotocol Label Switching (MPLS) protocol. A protocol, as used herein, is a set of formal rules describing how to transfer data between e.g., two nodes in a data network.

Figure 2:
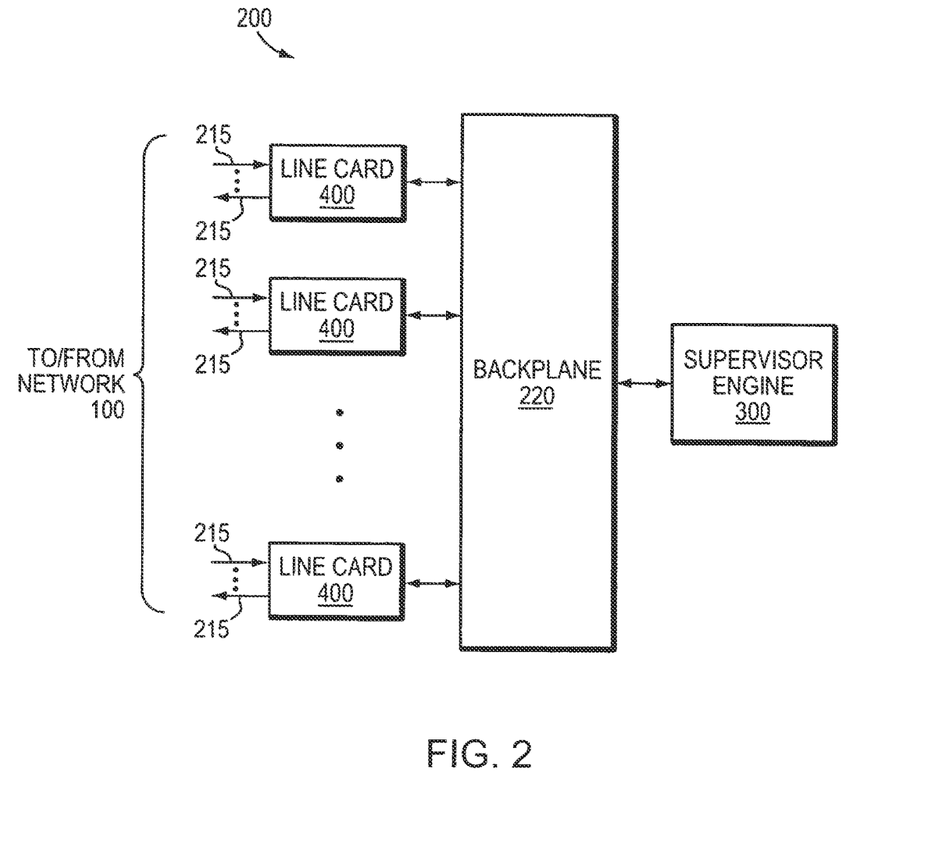
FIG. 2 is a high-level schematic block diagram of an intermediate node that may be advantageously used with the present invention.

FIG. 2 is a high-level partial schematic block diagram of intermediate node 200, which is illustratively a router. Suitable intermediate nodes that may be used with the present invention include the Cisco 7200, 7600 and 12000 Series routers available from Cisco Systems Incorporated, San Jose, Calif. Intermediate node 200 comprises one or more line cards 400 and a supervisor engine card 300 interconnected by a backplane 220. Node 200 is configured to perform, inter alia, various conventional layer-2 (L2) and layer-3 (L3) switching and routing functions including maintaining MPLS Traffic Engineering label switched paths (MPLS-TE LSPs) in accordance with the inventive technique. As used herein, L2 and L3 refer to the data link layer and network layer, respectively, of the Open Systems Interconnection reference model (OSI-RM). Node 200 is also configured to support various protocols which may include Open Shortest Path First (OSPF), Intermediate-System-to-Intermediate-System (IS-IS), MPLS-TE, MPLS Differentiated Services TE (DS-TE), TCP/IP, Ethernet, Asynchronous Transfer Mode (ATM), and Frame Relay (FR).

The backplane 220 comprises a point-to-point interconnect bus that interconnects the various cards and allows data and signals to be transferred from one card to another. The line cards 400 connect (interface) the intermediate node 200 with the network 100. The line cards 400 transfer data between the intermediate node 200 and the network via ports 215 using various protocols such as, ATM and Ethernet. Functionally, the line cards 400 acquire data packets from the network 100 via the ports 215 and forward the data packets to the data bus 220, as well as transmit data packets received from the data bus 220 to the network 100 via the ports 215. The ports 215 may comprise, e.g., ATM, Ethernet, Fast Ethernet (FE), Gigabit Ethernet (GE), and FR ports.

Figure 3:
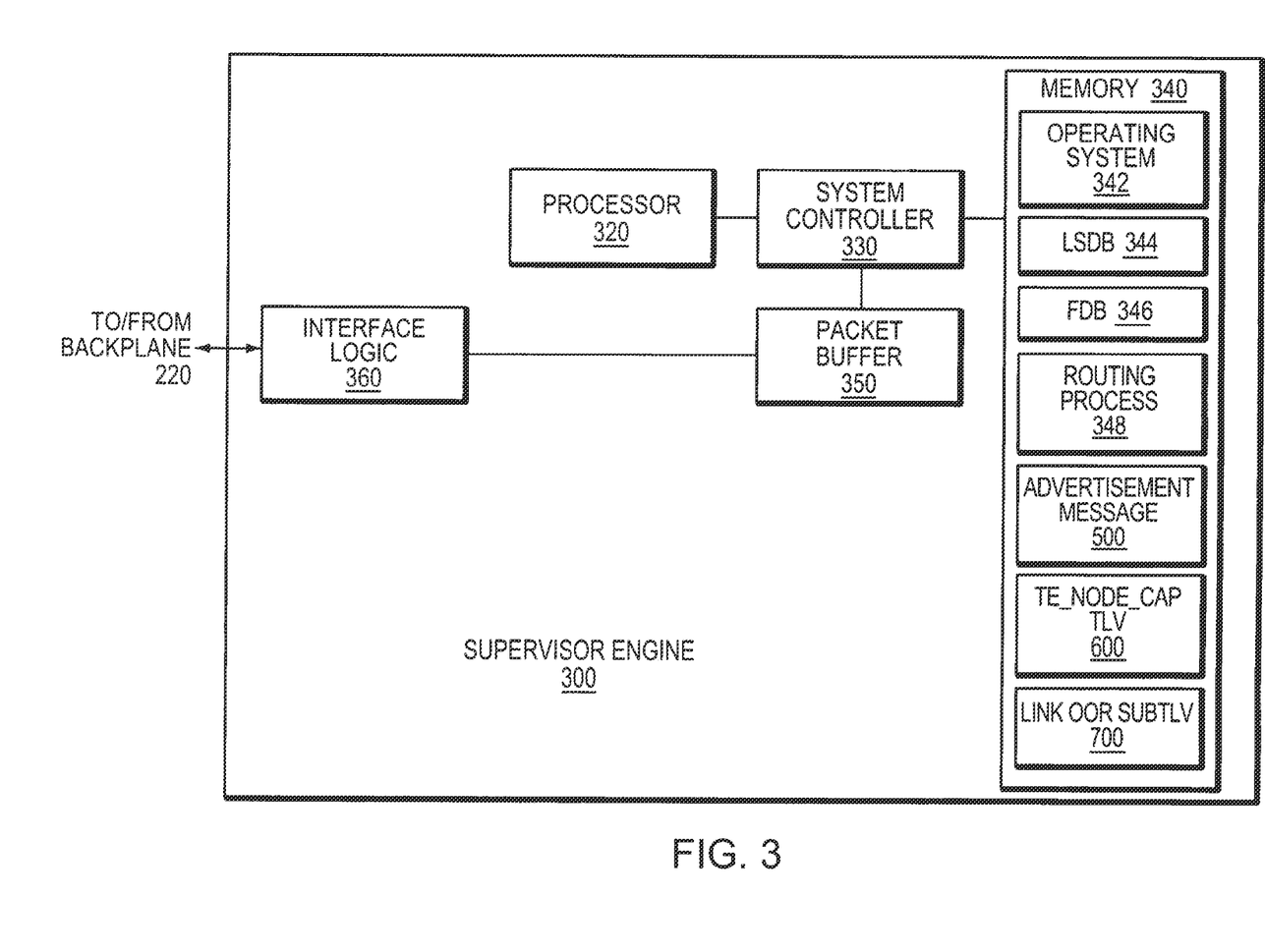
FIG. 3 is a partial schematic block diagram of a supervisor engine that may be used with the present invention.

The supervisor engine 300 comprises logic that is, inter alia, configured to manage node 200, maintain a centralized forwarding database (FDB) that it distributes to the line cards 400, maintain a link-state database (LSDB) and execute various protocols, such as OSPF, IS-IS, MPLS-TE, DS-TE, and IP. Moreover, engine 300 performs other functions including reporting "out-of-resources" (OOR) conditions for entities associated with node 200, such as data links, line cards and the node itself, to other nodes in the data network 100 in accordance with the present invention.

FIG. 3 is a high-level partial schematic block diagram of a supervisor engine 300 that may be advantageously used with the present invention. Supervisor engine 300 comprises a processor 320, system controller 330, packet buffer 350, interface logic 360 and memory 340. Interface logic 360 is coupled to the backplane 220, and is configured to transfer data between the backplane 220 and the processor 320. The memory 340 comprises random access memory (RAM) locations addressable by the system controller 330 for storing, e.g., data structures and software programs. Specifically, the memory 340 is a computer readable medium comprising Dynamic Random Access Memory (DRAM) devices configured to implement a 128 Megabyte (Mb) random-access memory. Memory 340 contains various software and data structures used by processor 320 including software and data structures that implement aspects of the present invention. It will be apparent to those skilled in the art that other computer readable mediums, such as disk storage devices and flash memory devices, may be used to store computer executable instructions that implement aspects of the present invention. Further, those skilled in the art would know that electromagnetic signals may be generated to carry computer executable instructions that implement aspects of the present invention over, e.g., a wireless data link or a data network, such as the Internet. It should be further noted that the present invention may be implemented in hardware, software, firmware or some combination thereof.

Memory 340 contains operating system 342, LSDB 344, FDB 346, routing process 348, advertisement message 500, traffic engineering node capabilities (TE_NODE_CAP) type-length-value (TLV) object 600 and a link OOR sub-TLV object 700. LSDB 344 is a link state database configured to hold information relating to links in the network, such as physical data links, that intermediate node 200 may use to, inter alia, derive a topology of the network 100. FDB 346 is a conventional forwarding database configured to hold conventional forwarding information, such as L2 and L3 addresses of nodes in the network and interface identifiers (IDs) that identify interfaces (e.g., port 215) through which a node associated with an address, contained in the FDB 344, may be reached. Operating system 342 contains computer executable instructions that functionally organize the intermediate node 200 by, e.g., invoking operations in support of software processes executing on the supervisor engine 300. These processes include routing process 348 which is a software process configured to implement various routing and switching protocols supported by the intermediate node 200, and functions that implement aspects of the present invention. Advertisement message 500, as will be described further below, is illustratively an OSPF opaque link-state advertisement (LSA) message that is used for exchanging information about the local state (e.g., data links) of the intermediate node 200 with other nodes in the data network 100. The TE_NODE_CAP TLV object 600 and link OOR sub-TLV object 700, also described further below, are objects that may be used to report OOR conditions for various entities associated with intermediate node 200 in accordance with the present invention.

System controller 330 is coupled to the processor 320 and memory 340, and comprises circuitry configured to enable processor 320 to access (e.g., read, write) memory locations contained in memory 340. Processor 320 is a conventional central processing unit (CPU) configured to execute instructions contained in memory 340 for, inter alia, maintaining LSDB 344 and FDB 346. Specifically, processor 320 executes instructions that acquire information about links and routes associated with the various intermediate nodes 200 contained in network 100, and uses this information to maintain LSDB 344 and FDB 346. Moreover, processor 320 executes instructions to generate advertisement messages containing link and route information known to intermediate node 200, and distribute these advertisement messages to other intermediate nodes 200 in the network that may process this information to maintain their LSDBs and FDBs, accordingly.

Packet buffer 350 contains RAM locations accessible to the interface logic 360 and the processor 320 via the system controller 330. Illustratively, packet buffer 350 comprises high-speed RAM devices, such as Synchronous DRAM (SDRAM) devices, and is configured to hold data packets acquired by the supervisor engine for processing by the processor 320. In addition, packet buffer 350 may hold data packets generated by processor 320 for transmission to other nodes in the network 100. These data packets may contain advertisement message information as described further below.

Figure 4:
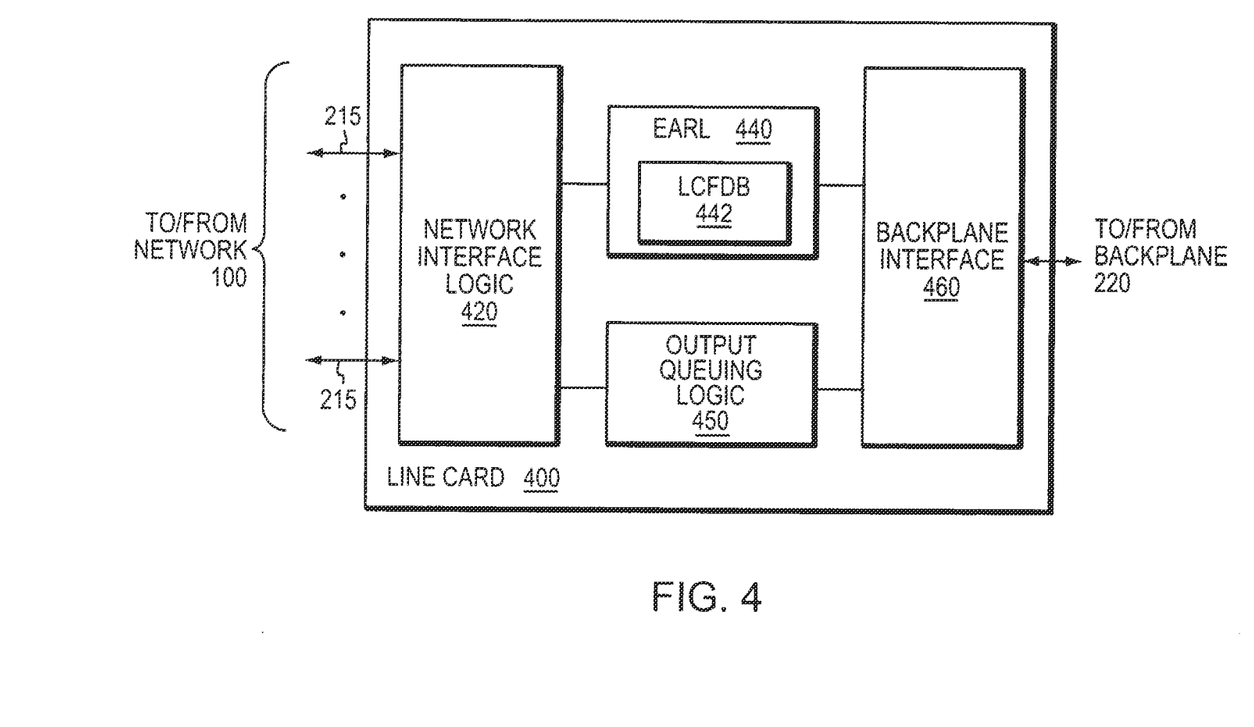
FIG. 4 is a partial schematic block diagram of a line card that may be advantageously used with the present invention.

Data (packets) are transferred to and from the network 100 via the line cards 400. FIG. 4 is a high-level partial schematic block diagram of an exemplary line card 400 that may be advantageously used with the present invention. Line card 400 comprises network interface logic 420, encoded address recognition logic (EARL) 440, backplane interface logic 460 and output queuing logic 450. Further, line card 400 may contain one or more ports 215 coupled to the network 100.

The network interface logic 420 interfaces the line card 400 to the network 100 and enables the line card 400 to transfer data packets to and from the network 100 via the ports 215. To that end, logic 420 comprises conventional interface circuitry that may incorporate the signal, electrical and mechanical characteristics, and interchange circuits, needed to interface line card 400 with the network's physical media and protocols running over that media.

The backplane interface logic 460 contains circuitry that interfaces the line card 400 to the backplane 220 and enables the line card 400 to transfer data to and from other cards coupled to the backplane 220. The output queuing logic 450 contains circuitry, such as output queues and scheduling control logic, configured to control the transfer of data packets onto the network 100 via the ports 215. The EARL 440 is illustratively embodied in an application-specific integrated circuit (ASIC) that comprises circuitry configured to, inter alia, acquire and process data packets including making forwarding decisions for the packets using. The EARL 440 contains a line-card forwarding database (LCFDB) 442 configured to hold information, such as destination addresses and ports, that is used the EARL 440 to determine destinations for packets processed by the EARL 440. This information may be derived from the FDB 346 and downloaded to the line card 400 by the supervisor engine 300.

Operationally, data packets are acquired from the network 100 by the network interface 420 via ports 215 and transferred to the EARL 440 where the packets are processed. This processing may include using the LCFDB 442 to determine a destination for each packet, such as another card coupled to the backplane 220 or a port 215 on the line card 400. After the destination for a packet is determined, the EARL 440 directs the backplane interface 460 to transfer the packet to the destination via the backplane 220, if the destination is another card, or to the output queuing logic 450, if the destination is a port 215 on the line card 400. Data packets destined for the supervisor engine 300 are acquired from the backplane 220 by the interface logic 360 and placed in a packet buffer 350 where they are held for further processing by the processor 320.

Illustratively, intermediate node 200 is configured to execute the OSPF protocol and periodically advertise link-state information using advertisement messages. A version of OSPF that may be used to configure intermediate node 200 is described in J. Moy, "OSPF Version 2," Request For Comments (RFC) 2328 which is available from the Internet Engineering Task Force (IETF), http://www.ietf.org and is hereby incorporated by reference in its entirety as though fully set forth herein. It should be understood that the OSPF protocol is used for illustrative purposes and that other well-known protocols, such as the IS-IS protocol, may be adapted to take advantage of the present invention.

Figure 5:
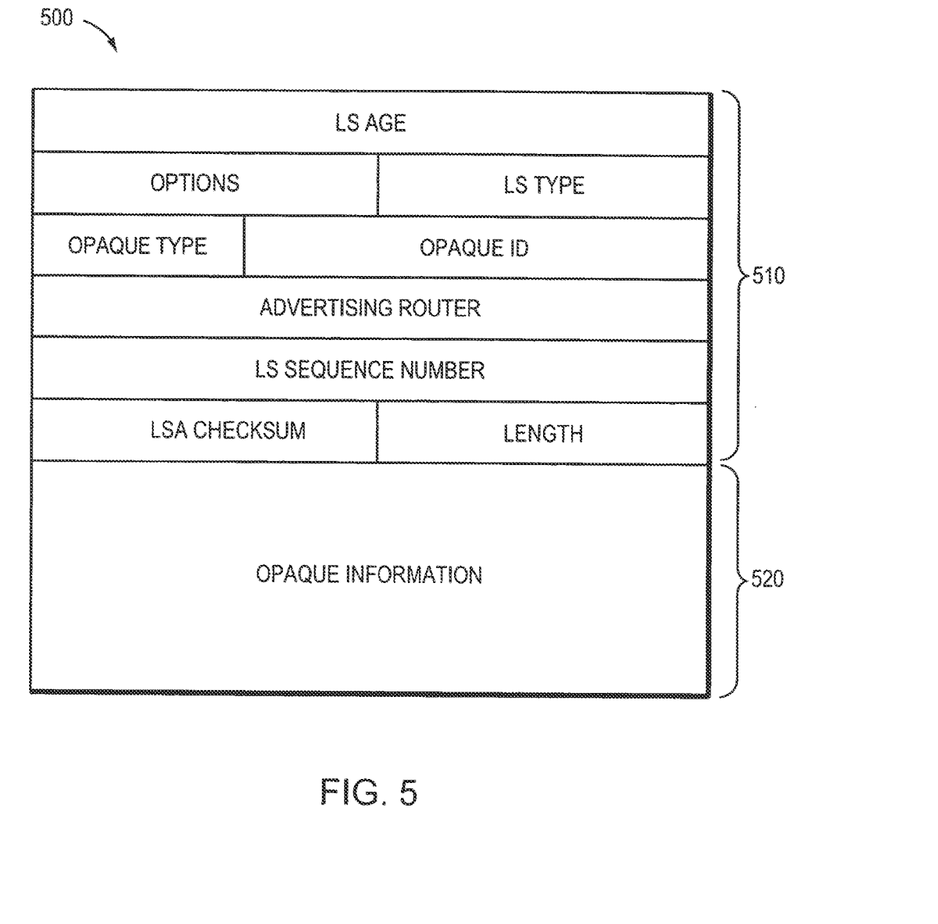
FIG. 5 is a partial schematic block diagram of an Open Systems Shortest Path First (OSPF) protocol link-state advertisement (LSA) that may be advantageously used with the present invention.

In accordance with OSPF, a LSA is an advertisement message that describes the local state of an intermediate node including, e.g., the link-state of the intermediate node's interfaces and physical data links. LSAs are broadcast (flooded) throughout the routing domain associated with the intermediate node and contain information (e.g., linkstates) that may be used to form the basis of information contained in, e.g., the intermediate node's LSDB 344. FIG. 5 is a schematic block diagram of a LSA 500 that may be advantageously used with the present invention. LSA 500 is an OSPF opaque LSA that contains a header field 510 and an opaque information field 520. The header field 510 contains various information associated with the LSA including an "age" of the LSA, various options, a link-state type, an opaque type, an opaque identifier (ID), the identity of the advertising router, a sequence number of the LSA, a checksum of the LSA and a length of the LSA. The opaque information field 520 contains various information about entities related to the node generating the LSA. These entities may include data links and line cards associated on the node as well as the node itself. An opaque LSA that may be used with the present invention is described in R. Coltun, "The OSPF Opaque LSA Option," RFC 2370, available from the IETF and is hereby incorporated by reference in its entirety as though fully set forth herein.

The present invention relates to a technique for notifying nodes in a data network of OOR conditions of entities associated with the nodes without advertising the entities as having a maximum cost. The entities may be a node, links on the node and/or line cards on the node. The OOR condition may be caused by resources associated with the entities becoming exhausted. According to the inventive technique, nodes are notified of the OOR condition illustratively via one or more TLV objects that are contained in an advertisement message.

Figure 6:
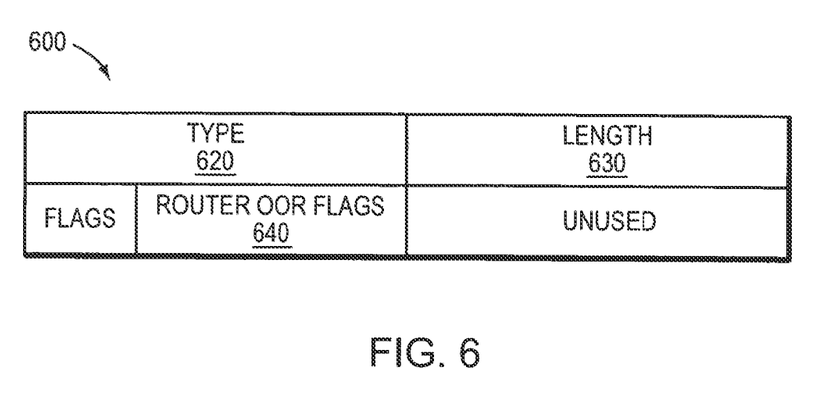
FIG. 6 is a schematic block diagram of a node capabilities type-length-value (TLV) data structure that may be advantageously used with the present invention.

According to an aspect of the present invention, OOR conditions associated with a particular node are illustratively advertised to other nodes in a data network via TLV objects contained in the opaque information field 520 of an opaque LSA 500. FIG. 6 is a schematic block diagram of a TE_NODE_CAP TLV object 600 that may be used to report an OOR condition for a node in accordance with the present invention. A TE_NODE_CAP TLV object that may be adapted for use with the present invention is described in A. Lindem et al., "Extensions to OSPF for Advertising Optional Router Capabilities," draft-ietf-ospf-cap-03.txt, and J P Vasseur et al., "OSPF MPLS Traffic Engineering capabilities," draft-vasseur-ospf-te-caps-00.txt, both of which are available from the IETF and hereby incorporated by reference in their entirety as though fully set forth herein.

TLV 600 comprises a type field 620, a length field 630, a flags field and a router OOR flags field 640. The type field 620 contains a value that identifies the TLV object 600 as a TE_NODE_CAP TLV object. The length field 630 holds a value that indicates the length of the TLV object 600, preferably in bytes. The flags field is illustratively a bit-wise mask configured to hold various flag values.

The router OOR flags field 640 contains flags (e.g., bits) that illustratively indicate whether various DS-TE classes associated with the intermediate node 200 are out of resources. Specifically, the router OOR flags field 640 illustratively holds an eight-bit bit-wise mask value, wherein each bit corresponds to a flag associated with a particular DS-TE class (e.g., DS-TE classes 0-7) as it relates to the intermediate node 200. Illustratively, an intermediate node 200 reports an OOR condition for a particular DS-TE class (as it relates to the node 200) by asserting (e.g., setting to one) the corresponding flag (i.e., bit) in the router OOR flags field 640. For example, assume bit 0 of the router OOR flags field 640 corresponds to the flag for DS-TE class 0. If the DS-TE class 0 (as it relates to the intermediate node 200) has encountered an OOR condition, the node 200 indicates this by asserting the flag associated with the DS-TE class 0 (i.e., bit 0) of the router OOR flags field 640. If the intermediate node 200 is unable to process any new MPLS-TE LSPs for any DS-TE class, it illustratively asserts all of the flags in the router OOR flags field 640.

Figure 7:
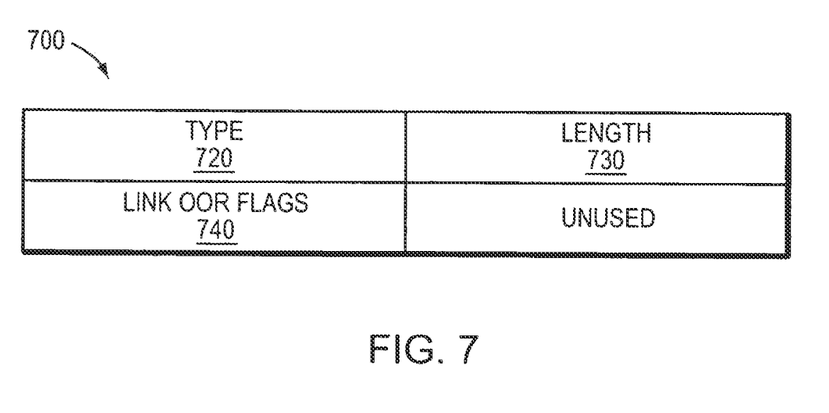
FIG. 7 is a schematic block diagram of a link capabilities sub-TLV data structure that may be advantageously used with the present invention.

In accordance with another aspect of the present invention, OOR conditions associated with data links and line cards of a particular node are likewise illustratively reported in the opaque information field 520 of an opaque LSA 500 using TLV objects. FIG. 7 is a schematic block diagram of a link OOR sub-TLV object 700 that may be used to report an OOR condition for a particular link in accordance with the present invention. TLV object 700 comprises a type field 720, a length field 730 and a link OOR flags field 740. The type field 720 holds a value that identifies the TLV object 700 as a link OOR TLV object. The length field 730 holds a value that represents the length of the TLV 700, illustratively in bytes. The link OOR flags field 740 holds a value that illustratively represents DS-TE classes associated with the link that have encountered an OOR condition. Illustratively, the value is an eight-bit bit-wise mask value wherein each bit represents a particular DS-TE class associated with the data link.

In accordance with the present invention, resources are reserved for MPLS-TE LSPs in data network 100 using the ReSource ReserVation Protocol (RSVP). RSVP is defined in R. Braden, et al., "Resource ReSerVation Protocol (RSVP)," RFC 2205 available from the IETF and is hereby incorporated by reference in its entirety as though fully set forth herein.

When a new MPLS-TE LSP is signaled to an entity that experiences an OOR condition, the node 200 associated with the entity generates and forwards a RSVP path error message to the new MPLS-TE LSP's head-end node. Illustratively, the path error message contains an error code that indicates the entity's OOR condition to the head-end node. The head-end node may respond to the error message by pruning the entity from its FDB such that it no longer considers the entity in path calculations for new MPLS-TE LSPs. In addition, the head-end node may calculate a new path for the new MPLS-TE LSP that excludes the entity and use RSVP to reserve resources for the new MPLS-TE LSP on the new path.

Figure 8:
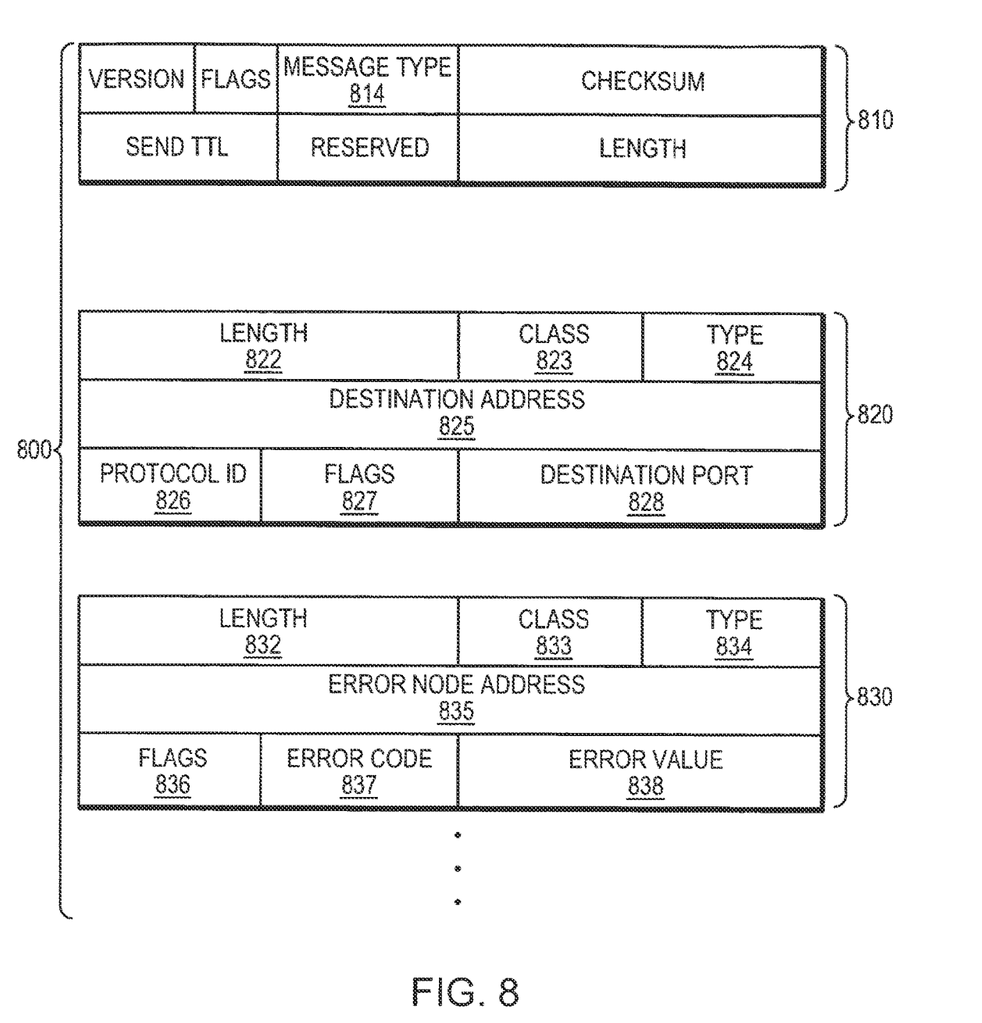
FIG. 8 is a schematic block diagram of a path error message that may be advantageously used with the present invention.

FIG. 8 is a schematic block diagram of a path error message 800 that may be advantageously used with the present invention. Message 800 comprises a header 810, a session object 820 and an error specification object 830. It should be noted that message 800 may contain other objects defined by, e.g., RSVP. The header contains various information including a message type field 814 which holds a value that indicates the message is a path error message.

The session object 820 comprises a length field 822, a class field 823 and a type field 824. The length field 822 holds a value that indicates a size of the object 820, illustratively in bytes. The class field 823 holds a value that indicates the object is, e.g., an RSVP SESSION class object. The type field 824 holds a value that indicates a type of object within the class.

The session object 820 contains additional information including a destination address field 825, a protocol identifier (ID) field 826, a flags field 827 and a destination port field 828. The destination address field 825 and destination port field 828 hold values that represent an address and port (e.g., IP address and port), respectively, associated with the receiver. The protocol ID field 826 holds an identifier that identifies a protocol of the data flow associated with the new reservation. The flags field 827 holds a value that represents various flags associated with the session object 820.

The error specification object 830 comprises a length field 832, a class field 833 and a type field 834. The length field 832 holds a value that indicates a size of the object 830, illustratively in bytes. The class field 833 holds a value that indicates the object is, e.g., an RSVP ERROR_SPEC class object. The type field 824 holds a value that indicates a type of object within the class (e.g., IPv4 type object, IPv6 type object).

The error specification object further contains an error node address field 835, a flags field 836, an error code field 837 and an error value field 838. The error node address field 835 holds a value that represents an address (e.g., an IP address) of a node in the path that detected the error. The flags field 836 holds a value that represents flags associated with the error specification object 830. The error code field 837 holds a value that describes the error and the error value field 838 holds a value that represents various additional information about the error. Illustratively, the error code field 837 holds a value that indicates an OOR condition that has been encountered on the node and the error value field 838 holds a value that indicates the entity associated with the node that encountered the OOR condition.

A node illustratively indicates OOR conditions associated with DS-TE classes for a particular link by asserting the appropriate link OOR flags in the link OOR flags field 740 of the sub-TLV object 700. The sub-TLV object 700 is included in the opaque information field 520 of an LSA 500 in a conventional manner such that the sub-TLV object 700 is associated with the link encountering the OOR condition. Further, if a line card encounters one or more OOR conditions, a node may advertise this condition by including an appropriately initialized sub-TLV object 700 that indicates the OOR conditions for each link on the line card in an LSA 500.

Figure 9:
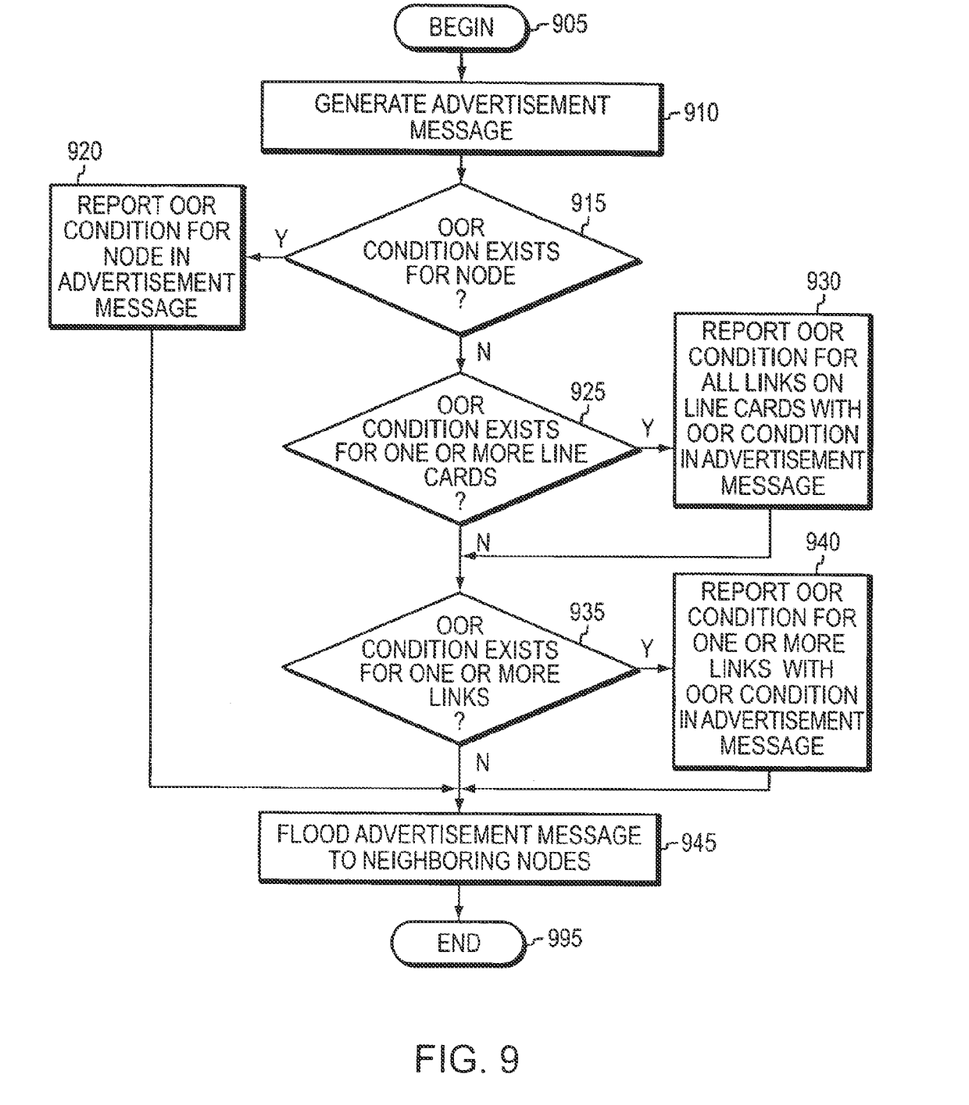
FIG. 9 is a flow diagram of a sequence of steps that may be used to generate and broadcast (flood) an advertisement message that indicates an out-of-resources (OOR) condition of an entity associated with an intermediate node.

As noted above, in accordance with the present invention, an OOR condition associated with an entity on an intermediate node 200 is reported in an advertisement message, such as LSA 500, and flooded to neighboring nodes. FIG. 9 is a flow chart of a sequence of steps that may be used to configure an intermediate node 200 to generate and flood an advertisement message that indicates an OOR condition for an entity associated with the intermediate node 200 in accordance with the present invention. The sequence begins at Step 905 and proceeds to Step 910 where the LSA 500 (advertisement message) is generated. Illustratively, the processor 320 generates the LSA 500 by allocating an opaque LSA 500 in memory 340 and initializing the its header 510 in accordance with RFC 2370.

Next, at Step 915, a check is performed to determine if an OOR condition exists for the node 200, itself. If an OOR condition exists for the node itself, the sequence proceeds to Step 920, where the OOR condition for the node is reported in the advertisement message and the sequence proceeds to Step 945. Illustratively, at Step 915 node 200 determines if one or more DS-TE classes serviced by node 200 have encountered an OOR condition. If so, at Step 920, node 200 reports the OOR condition in the LSA 500 by generating and placing a TE_NODE_CAP TLV object 600 that indicates the condition in the LSA 500. Specifically, processor 320 illustratively generates the object 600 by (i) allocating an object 600 in memory 340, (ii) initializing the type 620, length 630 and flags fields in a conventional manner and (iii) asserting flags in the router OOR flags field 640 that correspond to the DS-TE classes that have encountered OOR conditions. Node 200 then places (e.g., copies) the generated object 600 in the opaque information area 520 of the generated advertisement message 500 in a conventional manner. It should be noted that if the node is out of resources such that it cannot support any additional MPLS-TE LSPs for any DS-TE class, all the flags in the router OOR flags field 640 are asserted.

If an OOR condition does not exist for the node itself, the sequence proceeds to Step 925 where a check is performed to determine if an OOR condition exists for one or more line cards 400 on the node 200. If not, the sequence proceeds to Step 935. Otherwise, the sequence proceeds to Step 930 where OOR conditions for the one or more line cards are reported in the LSA 500. Illustratively, at Step 925, node 200 determines if one or more line cards 400 have encountered an OOR condition for the DS-TE classes handled by the line cards. If so, for each line card 400 that has encountered the OOR condition, node 200 generates and places (e.g., copies) a link OOR sub-TLV object 700 for each data link associated with the line card 400 in the opaque information area 520 of the LSA 500. Specifically, processor 320 illustratively generates the sub-TLV by (i) allocating a sub-TLV object, (ii) placing a value indicating the sub-TLV object is a link sub-TLV in the type field 720, (iii) placing a value that represents the length of the sub-TLV 700 in the length field 730 and (iv) asserting (e.g., setting to one) the link OOR flags 740 corresponding to the DS-TE classes encountering the OOR condition. The node 200 then places the generated sub-TLV object 700 in the opaque information area 520 of the LSA 500, as described above.

At Step 935, a check is performed to determine if OOR conditions exist for one or more data links associated with the node 200. If not, the sequence proceeds to Step 945. Otherwise, the sequence proceeds to Step 940 where OOR conditions for the one or more links are reported in the LSA 500. Illustratively, at Step 935 for each line card 400, node 200 determines if one or more DS-TE classes associated with data links on line cards have encountered an OOR condition. If so, at Step 940, for each link that has encountered a OOR condition, node 200 generates a link OOR sub-TLV object 700, as described above, including asserting link OOR flags 740 corresponding to the DS-TE classes associated with the link that have encountered the OOR condition. Node 200 then places the generated sub-TLV object 700 in the opaque information area 520 of the LSA 500, as described above.

At Step 945, node 200 floods (broadcasts) the LSA 500 to its neighboring nodes in a conventional manner. Illustratively, the intermediate node floods the LSA 500 by directing one or more of its line cards 400 to transfer the LSA 500 onto the data network. The sequence ends at Step 995.

It should be noted that in the above-described embodiment of the invention, message generation may be event driven. For example, a LSR may generate and issue an advertisement message reporting an OOR condition when the LSR processes a new MPLS-TE LSP and determines that it cannot accommodate the new MPLS-TE LSP due to an OOR condition. The OOR condition may occur, for example, i) at the node level (e.g., accommodating the new MPLS-TE LSP would cause the total number of MPLS-TE LSPs for a given DS-TE class to exceed the configured maximum number of MPLS-TE LPs and/or exhaust memory on the LSR), ii) at the line card level (e.g., a new entry in the line card's LCFDB cannot be created to accommodate the new MPLS-TE LSP) or iii) at the link level (e.g., accommodating the new MPLS-TE LSP would cause the total number of LSPs from a given DS-TE class on the link to exceed the configured maximum number of MPLS-TE LSPs that can be handled by the link).

Figure 10A:
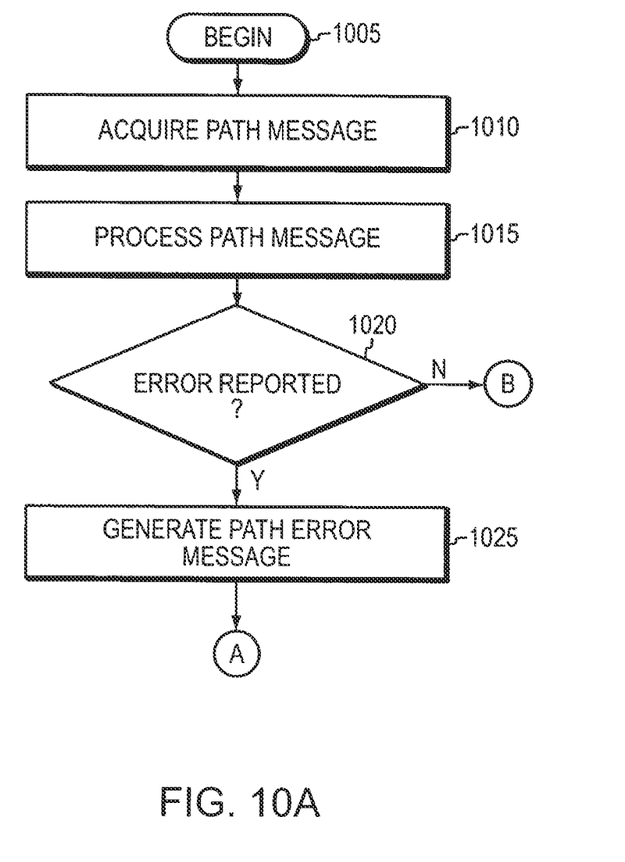
FIGS. 10A-B are flow diagrams of a sequence of steps that may be used to generate and flood a path error message in response to an OOR condition in accordance with the present invention.
Figure 10B:
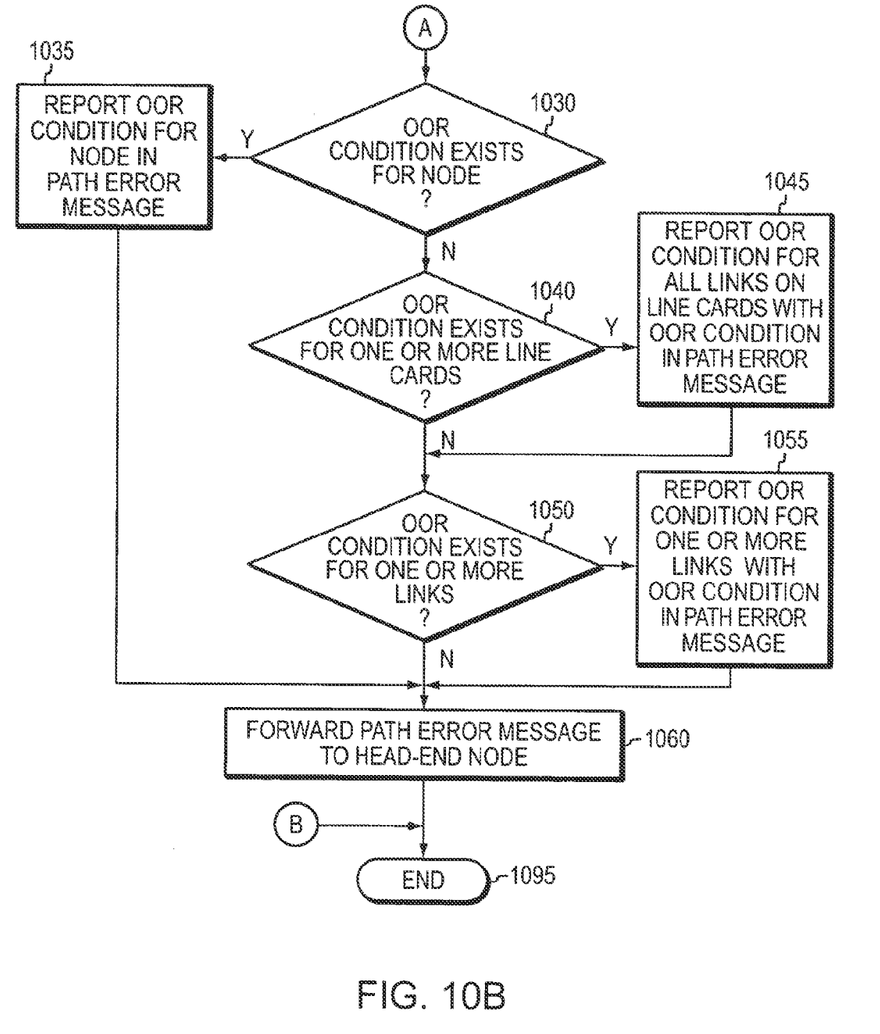

In accordance with the inventive technique, a node that encounters an OOR condition when processing a path message (e.g., an RSVP Path message) originated by a head-end node reports the OOR condition to the head-end node via a path error message. FIGS. 10A-B are flow charts of a sequence of steps that may be used to report an OOR condition to a head-end node that originated a path message in accordance with the inventive technique.

The sequence begins at Step 1005 and proceeds to Step 1010 where an intermediate node 200 acquires a path message (e.g., RSVP Path message) originated by a head-end node. At Step 1015, the intermediate node 200 processes the acquired path message illustratively in accordance with RSVP. At Step 1020, the node 200 determines if an error has occurred with respect to the processing of the path message. If an error has not occurred, the sequence proceeds to Step 1095 (FIG. 10B) where the sequence ends.

At Step 1020, if an error has occurred with respect to the processing of the path message, the sequence proceeds to Step 1025 where a path error message 800 is generated. Illustratively, the node 200 generates the path error message 800 by allocating an area in memory 340 for the path error message, generating a header 810 and error object 830 in a conventional manner, and placing them in the allocated path error message 800.

At Step 1030, a check is performed, illustratively by node 200, to determine if the error occurred due to an OOR condition with the node itself. If so, the sequence proceeds to Step 1035 where the node reports a "node OOR condition" in the path error message 800 and the sequence proceeds to Step 1060. Illustratively, the intermediate node 200 reports the "node OOR condition" by setting the values of the error code 837 and error value 838 fields to indicate OOR condition has occurred with the node itself.

If the error did not occur due to an OOR condition with the node itself, the sequence proceeds to Step 1040 where a check is performed, illustratively by node 200, to determine if the error occurred due to OOR conditions with one or more line cards on the node 200. If not, the sequence proceeds to Step 1050. Otherwise, the sequence proceeds to Step 1045 where the node 200 reports OOR conditions for the line cards in the path error message 800. Illustratively, the node 200 sets the values of the error code 837 and error value 838 fields to indicate the line cards that have encountered the OOR condition.

At Step 1050, a check is performed, illustratively by node 200, to determine if the error occurred due to OOR conditions for one or more links on the node 200. If not, the sequence proceeds to Step 1060. Otherwise, the sequence proceeds to Step 1055 where the node 200 reports the OOR conditions for the one or more links in the path error message 800. Illustratively, the node 200 sets the values of the error code 837 and error value 838 fields to indicate the links that have encountered the OOR condition.

At Step 1060, the intermediate node 200 forwards the path error message to the head-end node that originated the path message. The sequence ends at Step 1095.

The foregoing description has been directed to specific embodiments of this invention. It will be apparent that other variations and modifications may be made to the described embodiments, with the attainment of some or all of the advantages of the present invention. Therefore, it is an object of the appended claims to cover all such variations and modifications as come within the true spirit and scope of the invention.

What is claimed is:

1. A method comprising:
generating, at an intermediate node contained in a data network, an advertisement message having one or more type-length-value (TLV) objects including at least a first indicator and a second indicator, the first indicator corresponding to a first Differentiated Service Traffic Engineering (DS-TE) class associated with the intermediate node and the second indicator corresponding to a second DS-TE class associated with the intermediate node, wherein the first indicator, when set, indicates that an Out Of Resource (OOR) condition causing the intermediate node to reject a new Label Switched Path (LSP) for the first DS-TE class has been detected, and the second indicator, when set, indicates that an OOR condition causing the intermediate node to reject the new LSP for the second DS-TE class has been detected;
in response to detecting a first OOR condition on the intermediate node for the first DS-TE class, setting the first indicator; and
after setting the first indicator, broadcasting the advertisement message on the data network, thereby causing a head-end node to avoid using the first DS-TE class of the intermediate node in the new LSP.

2. The method of claim 1, further comprising:
in response to detecting a second OOR condition on the intermediate node for the second DS-TE class, setting the second indicator.

3. The method of claim 1, wherein the one or more TLV objects are traffic engineering node capabilities (TE_NODE_CAP) TLV objects.

4. The method of claim 1, wherein the one or more TLV objects are traffic engineering link capabilities TLV objects.

5. The method of claim 1, wherein the first indicator and the second indicator are flags contained in the one or more TLV objects to report the intermediate node is out of resources.

6. The method of claim 1, wherein the first indicator and the second indicator are contained in a router OOR flags field.

7. The method of claim 1, wherein the first indicator and the second indicator are contained in a link OOR flags field.

8. An intermediate node in a data network comprising:
one or more computer processors; and
a memory storing instructions that, when executed by the one or more computer processors, cause the intermediate node to:
generate an advertisement message having one or more type-length-value (TLV) objects including at least a first indicator and a second indicator, the first indicator corresponding to a first Differentiated Service Traffic Engineering (DS-TE) class associated with the intermediate node and the second indicator corresponding to a second DS-TE class associated with the intermediate node, wherein the first indicator, when set, indicates that an Out Of Resource (OOR) condition causing the intermediate node to reject a new Label Switched Path (LSP) for the first DS-TE class has been detected, and the second indicator, when set, indicates that an OOR condition causing the intermediate node to reject the new LSP for the second DS-TE class has been detected;

in response to detecting a first OOR condition on the intermediate node for the first DS-TE class, set the first indicator; and after setting the first indicator, broadcast the advertisement message on the data network, thereby causing a head-end node to avoid using the first DS-TE class of the intermediate node in the new LSP.

9. The intermediate node of claim 8, wherein the instructions further cause the intermediate node to:

in response to detecting a second OOR condition on the intermediate node for the second DS-TE class, set the second indicator.

10. The intermediate node of claim 8, wherein the one or more TLV objects are traffic engineering node capabilities (TE_NODE_CAP) TLV objects.

11. The intermediate node of claim 8, wherein the one or more TLV objects are traffic engineering link capabilities TLV objects.

12. The intermediate node of claim 8, wherein the first indicator and the second indicator are flags contained in the one or more TLV objects to report the intermediate node is out of resources.

13. The intermediate node of claim 8, wherein the first indicator and the second indicator are contained in a router OOR flags field.

14. The intermediate node of claim 8, wherein the first indicator and the second indicator are contained in a link OOR flags field.

15. A non-transitory computer-readable medium storing instructions that, when executed by an intermediate node in a data network, cause the intermediate node to:

generate an advertisement message having one or more type-length-value (TLV) objects including at least a first indicator and a second indicator, the first indicator corresponding to a first Differentiated Service Traffic Engineering (DS-TE) class associated with the intermediate node and the second indicator corresponding to a second DS-TE class associated with the intermediate node, wherein the first indicator, when set, indicates that an Out Of Resource (OOR) condition causing the intermediate node to reject a new Label Switched Path (LSP) for the first DS-TE class has been detected, and the second indicator, when set, indicates that an OOR condition causing the intermediate node to reject the new LSP for the second DS-TE class has been detected;

in response to detecting a first OOR condition on the intermediate node for the first DS-TE class, set the first indicator; and after setting the first indicator, broadcast the advertisement message on the data network, thereby causing a head-end node to avoid using the first DS-TE class of the intermediate node in the new LSP.

16. The non-transitory computer-readable medium of claim 15, wherein the instructions further cause the intermediate node to:

in response to detecting a second OOR condition on the intermediate node for the second DS-TE class, set the second indicator.

17. The non-transitory computer-readable medium of claim 15, wherein the one or more TLV objects are traffic engineering node capabilities (TE_NODE_CAP) TLV objects.

18. The non-transitory computer-readable medium of claim 15, wherein the one or more TLV objects are traffic engineering link capabilities TLV objects.

19. The non-transitory computer-readable medium of claim 15, wherein the first indicator and the second indicator are contained in a router OOR flags field.

20. The non-transitory computer-readable medium of claim 15, wherein the first indicator and the second indicator are contained in a link OOR flags field.

* * * * *